(12) United States Patent
Flikkema et al.

(10) Patent No.: US 11,693,950 B2
(45) Date of Patent: Jul. 4, 2023

(54) SYSTEM AND METHOD FOR ACTIVE CYBERATTACK DEFENSE

(71) Applicant: Arizona Board of Regents on Behalf of Northern Arizona University, Flagstaff, AZ (US)

(72) Inventors: Paul G Flikkema, Flagstaff, AZ (US); Bertrand F Cambou, Flagstaff, AZ (US); James D Palmer, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 0 days.

(21) Appl. No.: 16/907,050

(22) Filed: Jun. 19, 2020

(65) Prior Publication Data
US 2020/0401691 A1 Dec. 24, 2020

Related U.S. Application Data

(60) Provisional application No. 62/863,758, filed on Jun. 19, 2019.

(51) Int. Cl.
*G06F 21/52* (2013.01)
*G06F 21/12* (2013.01)

(52) U.S. Cl.
CPC .......... *G06F 21/52* (2013.01); *G06F 21/125* (2013.01); *G06F 2221/033* (2013.01); *G06F 2221/0724* (2013.01)

(58) Field of Classification Search
CPC .......... G06F 21/6245; G06F 16/2255; G06F 16/2365; G06F 2221/2141
See application file for complete search history.

(56) References Cited

U.S. PATENT DOCUMENTS

| 9,459,685 B1 | 10/2016 | Flikkema |
| 10,496,409 B2 | 12/2019 | Flikkema |

(Continued)

OTHER PUBLICATIONS

Silio et al., "Control Memory Word Width Optimization Using Multiple-Valued Circuits", IEEE Transactions on Computers, vol. c-30, No. 2, Feb. 1981, 6 pages.

*Primary Examiner* — Ashokkumar B Patel
*Assistant Examiner* — William B Jones
(74) *Attorney, Agent, or Firm* — Quarles & Brady LLP

(57) ABSTRACT

Computing systems with dynamic architectures may be used to secure against code-injection attacks and other exploits. A system may generate multiple representations of instructions or other data associated with each of a set of configurations of the system. The system may periodically or randomly change configurations such that malicious code that is executable in one configuration cannot be executed in another configuration. A system may also detect malicious code by comparing code previously generated in one representation with different representations of the same code. If, during execution of a representation of a program code, the system determines that the representation specifies instructions that differ from other representations of the same program code, they system may stop executing the compromised program code, change its configuration, and continue to execute another representation of the program code that has not been compromised.

8 Claims, 10 Drawing Sheets

(56) References Cited

U.S. PATENT DOCUMENTS

| | | | |
|---|---|---|---|
| 10,747,711 B2 | 8/2020 | Telesca, Jr. et al. | |
| 2012/0060143 A1* | 3/2012 | Nigul | G06F 21/51 717/103 |
| 2019/0121997 A1* | 4/2019 | Levin | G06Q 30/0185 |
| 2019/0318091 A1* | 10/2019 | Gupta | G06F 21/566 |
| 2019/0377480 A1* | 12/2019 | Oh | G06F 9/3004 |

* cited by examiner

200

```
┌─────────────────────────────────────────────────────────────────┐
│  RECEIVE, IN A FIRST CONFIGURATION, FIRST PROGRAM CODE          │
│  EXECUTABLE IN THAT CONFIGURATION                               │
│                                                            202  │
└─────────────────────────────────────────────────────────────────┘
                                │
┌─────────────────────────────────────────────────────────────────┐
│  TRANSFORM THE FIRST PROGRAM CODE INTO AN ALTERNATE REPESENTATION│
│  AND STORE THE ALTERNATE REPRESENTATION IN MEMORY               │
│  AS SECOND PROGRAM CODE EXECUTABLE IN A SECOND CONFIGURATION    │
│                                                            204  │
└─────────────────────────────────────────────────────────────────┘
                                │
┌─────────────────────────────────────────────────────────────────┐
│  RECEIVE A REQUEST TO EXECUTE THE FIRST PROGRAM CODE            │
│                                                            206  │
└─────────────────────────────────────────────────────────────────┘
                                │
┌─────────────────────────────────────────────────────────────────┐
│  DETERMINE THAT A FIRST SET OF PROCESSING OPERATIONS DESCRIBED BY THE│
│  FIRST PROGRAM CODE DIFFERS FROM A SECOND SET OF OPERATIONS     │
│  DESCRIBED BY THE SECOND PROGRAM CODE                           │
│                                                            208  │
└─────────────────────────────────────────────────────────────────┘
                                │
┌─────────────────────────────────────────────────────────────────┐
│  SUSPEND OPERATIONS OF THE PROCESSING CIRCUITRY                 │
│                                                            210  │
└─────────────────────────────────────────────────────────────────┘
                                │
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐
│  RECONFIGURE PROCESSING CIRCUITRY TO OPERATE IN THE SECOND      │
│  CONFIGURATION                                                  │
│                                                            212  │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
                                │
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐
│  EXECUTE THE SECOND PROGRAM CODE IN PLACE OF                    │
│  THE FIRST PROGRAM CODE                                         │
│                                                            214  │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
```

*FIG. 2*

SYSTEM AND METHOD FOR ACTIVE CYBERATTACK DEFENSE

CROSS-REFERENCE TO RELATED APPLICATIONS

The present application claims priority U.S. Provisional Patent Application 62/863,758 entitled "System and Method for Active Cyberattack Defense" and filed on Jun. 19, 2019, the disclosure of which is incorporated herein by reference.

BACKGROUND OF THE INVENTION

Conventional computing devices include processing units and memory which are constructed using transistors. Since conventional transistors have well-defined "on" and "off" states, they are naturally suited to performing binary digital operations. Consequently, conventional computing architectures represent and store information in binary and perform computations using binary digital logic. For ease of use, modern computing systems provide programming interfaces allowing users to write programs in numerous programming languages which make use of statements and commands that resemble more common human language and/or mathematical notation. These programming interfaces provide compilers that convert programs written in high-level languages into binary machine code that can be executed by a processing unit such as a CPU.

Computing architectures using numeric bases other than binary have been proposed. For example, proposed trinary architectures represent data using three states (e.g., '−1', '0', and '1'). Though potentially more complex to implement, ternary architectures may be more efficient that conventional binary architectures. Similarly, memory devices capable of storing more than just binary values have been proposed and realized. For instance, multilevel FLASH memory may utilize three or more states enabling the storage of trinary value or values having higher bases. Other devices such as memristors have been proposed for use as multilevel memory cells and as building blocks for trinary digital logic. Although conventional binary computing systems and proposed trinary systems are different in some ways, they share fundamental similarities. For instance, both conventional binary computing systems and proposed trinary systems allow users to write programs in high-level languages which are translated by compilers into machine code that can be directly executed by a processing unit such as a CPU. Certain advanced conventional computing systems implement code-morphing technology allowing the advanced computing system to receive a program intended for a different architecture and dynamically reinterpret or recompile the code into machine code suitable to be executed by the advanced computing system.

BRIEF SUMMARY

The present computing system provides dynamic architectures which may include dynamic machine code instruction sets, dynamic memory mappings, and/or other configuration changes that affect the architecture of the system from the viewpoint of computing processes executing on the system. Such improved architectures may provide several physical or virtual processing modules, for example, which may be functional units or groups of functional units known as arithmetic/logical units (ALUs). Some such modules may have an instruction set including only conventional binary operations, while other modules may implement trinary, quaternary, other operations in bases beyond binary, or various combinations thereof. The present architecture is further configured to dynamically change its overall architecture. As an example, a dynamic system might have a binary processing unit, a trinary processing unit, and a quaternary processing unit, each unit having a distinct instruction set. At one moment, such a dynamic system might process only binary machine codes while at another it might process only trinary machine codes, and so on. In some embodiments, such a system makes use of multiple processing units (and thus multiple machine code instruction sets) concurrently. Furthermore, the exact configuration of the system may be varied from moment to moment, as described herein In an example embodiment, a computing system includes memory coupled to a processor configured to process machine code instructions specified according to at least two machine code instruction formats. The processor includes configuration management circuitry configured to control a machine code configuration of the processor. The configuration management circuitry is configured to cause the processor to accept, at a first time, instructions specified according to a first machine code instruction format and reject instructions specified according to a second machine code instruction format; and accept, at a second time, instructions specified according to the second machine code instruction format and reject instructions specified according to the first machine code instruction format. The computing system is configured to receive first machine code specifying first program code according to the first machine code instruction format; generate second machine code specifying the first program code according to the second machine code instruction format and store the second machine code in the memory; determine, in response to a first request to execute the first machine code, that the first machine code corresponds to a set of processor operations equivalent to the second machine code; and execute the first machine code.

In another example embodiment, a computing system comprises memory coupled to a processor, and a configuration controller configured to receive and process instructions directed to the computing system. The configuration controller further configured to cause the computing system to implement a first machine architecture at a first time and to cause the computing system to implement a second machine architecture at a second time. The computing system is configured, at the first time, to execute machine code instructions configured for execution by the computing system while implementing the first machine architecture and reject machine code instructions configured for execution by computing system while implementing the second machine architecture. The computing system is configured, at the second time, to execute machine code instructions configured for execution by the computing system while implementing the second machine architecture and reject machine code instructions configured for execution by the computing system while implementing the first machine architecture. The configuration controller is further configured to respond to a configuration signal by reconfiguring the computing system to implement either of the first machine architecture and the second machine architecture.

In another example embodiment a computer-implemented method comprises receiving, by reconfigurable processing circuitry operating in a first configuration, first program code executable by the processing circuitry in the first configuration; transforming the first program code into an alternate representation and storing it in memory coupled to the processing circuitry as second program code that is executable by the processing circuitry in a second configuration and not executable in the first configuration; receiving a request to execute the first program code; determining that a first set of processing operations as described by the first program code differs from a second set of processing operations as described by the second program code; and suspending operations of the processing circuitry in response to determining that the first and second sets of processing operations are different.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where:

FIG. 2 is a flowchart illustrating an example method performing according to embodiments herein.

DETAILED DESCRIPTION

Figure 1:
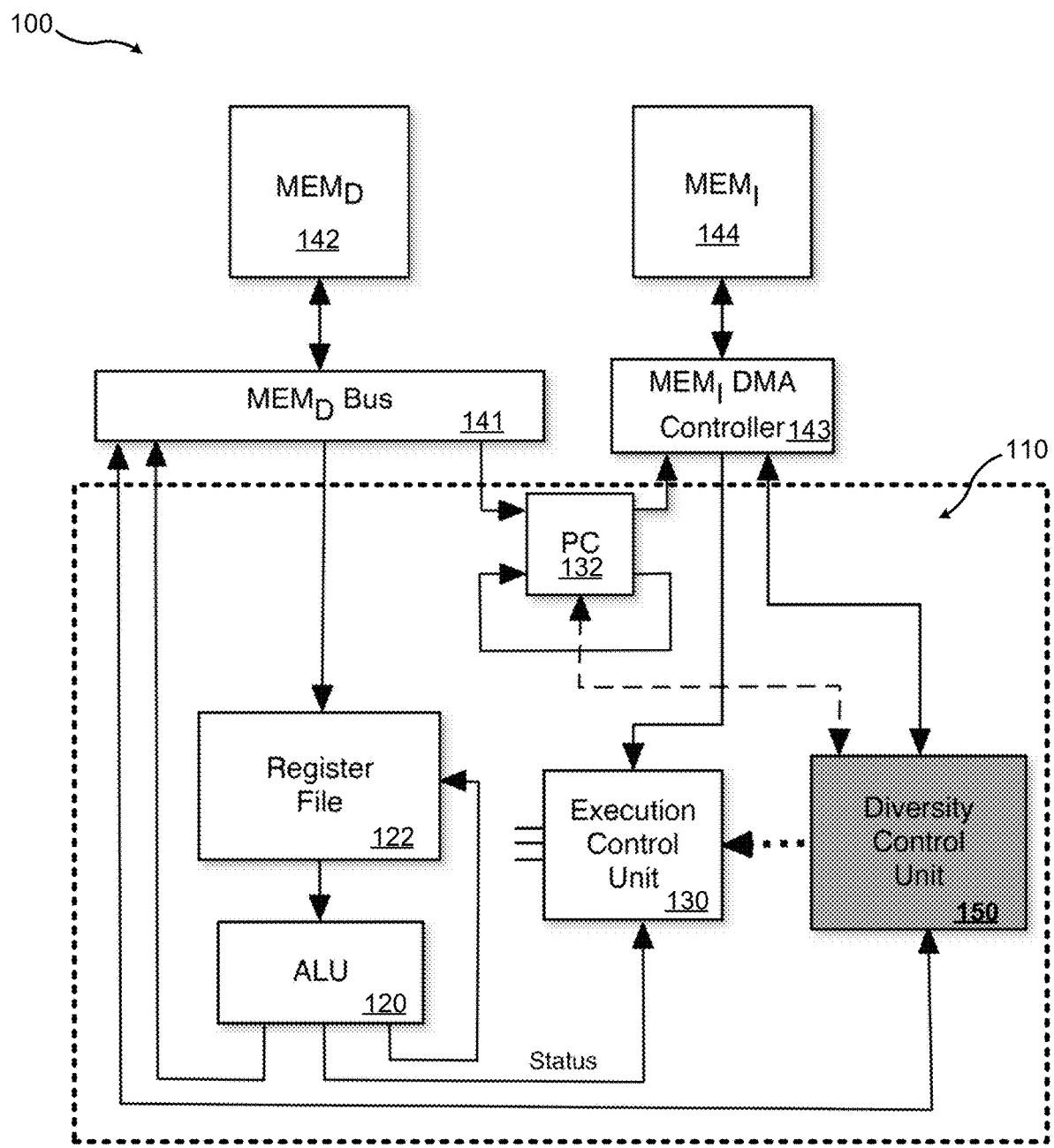
FIG. 1 is a block-level schematic of example computing system in which embodiments of the present invention may be practiced.

The described features, advantages, and characteristics may be combined in any suitable manner in one or more embodiments. One skilled in the relevant art will recognize that the system may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment.

This specification makes reference to various software constructs as modules "stored" and/or "instantiated" in memory. It should be understood that such constructs may be thought of both as instructions stored as data in a memory device but also as processes executing in processing circuitry in communication with that memory device. Thus, when processing circuitry executes the instructions associated with a particular software construct, the software construct is said to be instantiated within the memory, along with data structures created by during execution of the software construct. It should further be understood that, in some cases, multiple instances of the same software construct may be instantiated in one or more memory devices concurrently. "Memory" may refer to random-access memory, read-only memory, and/or registers within a processor or other similar structures.

Conventional computing systems such as those described above may have drawbacks addressed by embodiments disclosed herein. Because such conventional systems have a fixed architecture and a known instruction set, they are vulnerable to malicious code being deployed by intruders such as unauthorized users and hackers. For example, a common attack is a buffer overflow attack. An attacker exploits a bug in the operating system or in another program to insert data into a buffer data structure stored in memory of the computing system. If the attacker attempts to insert a large amount of data (i.e., larger than the intended size of the buffer), excess data may be stored in adjacent memory locations which store machine code instructions for the system to execute. If the attacker knows the system's architecture and the machine code instruction set for that system, the attacker can insert valid machine code into a memory location using this method, causing the system to execute unauthorized and malicious instructions.

In contrast to conventional approaches, embodiments disclosed herein are configured, for example, to dynamically change their architectures, incorporating computing units that (for example) perform operations in different numerical bases (e.g., binary, trinary, et al.). Because, in such embodiments, an outside attacker is not privy to the current state of the system, it may be impossible for the attacker to generate valid machine code executable by the system in its current state to cause the system to execute malicious instructions via an exploit. Such embodiments, may reduce or eliminate opportunities for an attacker to attempt espionage (i.e., determine what functions or operations the system is performing, or how they are performed, and/or which algorithms are used to perform various functions).

As described further herein, a reconfigurable computer processor may be used to actively defend a computing system against cyberattacks (or other security threats) while continuing execution of a desired program. The active defense may consist of two phases: detection of an attack and re-configuring and/or re-programming the system in such a way as to render the attack ineffective. Detection of the attack is accomplished using multiple representations of program instructions and data in the computer's memory. The representations in this representation set are each essentially unique choices among a multitude of choices. The representation set is unknown to any attacker. Practically, the representation set may comprise a minimum of three representations, with a greater number being desirable for greater security. Each representation set may be created using any means of encryption or other mechanisms of hiding or obfuscating information, as examples. Furthermore, in groups of multiple computing systems, each computing system may generate representations unique to that system. In such instances, even if an attacker compromises one system, it will be impossible to compromise any other system using the same exploit. Active defenses may also include creating a new configuration (which may include new representations, transitioning to a new, reconfiguring and re-programming a system either periodically or at random times, so that the system may remain secure even in the event that an attack is not detected. If a potential attacker is aware that the system is using this technique, the attacker may also be deterred from attempting an attack.

In some embodiments, multiple representations of a program or other set of instructions can be achieved by using encryption or other techniques, including forms of obfuscation and/or various information hiding techniques, including steganography, for example. In one non-limiting example, each representation may be an encrypted copy of the instructions using different encryption keys and/or different encryption schemes for each representation. In another non-limiting example, instructions may be re-ordered using a unique ordering for each representation. These unique orderings may also be encrypted. Thus any attempt to inject code is likely to use an invalid representation, which may be detected by the processor. In the second phase, the computer uses another different set of representations, also unknown to the attacker. Non-instruction data may also be stored using an essentially unique encrypted representations, which may prevent an attacker from using changes in the data to infer the representation of the program instructions.

Non-limiting examples of suitable representation schemes examples include those utilizing signed number systems, binary systems, ternary systems, quaternary systems, or any multiple-valued logic system. Specific examples include one's complement binary number system, two's complement binary number system, balanced number systems, and unbalanced number systems, among others found suitable for use with the present invention.

These strategies are useful against both random code-injection attacks and attacks that attempt to incrementally learn the computer's program and/or data. Assume that an attacker has successfully stored instructions in the computer's memory using any guessed representation set indexed by k. Because it is essentially unique, the attacker's instruction(s) is detected as invalid when fetched from memory. When an invalid instruction or set of instructions is detected, the processor immediately switches to another already-prepared representation, so that the attacker's stored instructions are not used, and eventually erased. As part of that switching operation, another representation k+1 is prepared and stored for future use. In this way, the processor immediately responds to the attack by switching to the already-prepared representation k+1 and simultaneously preparing and storing a representation set k+2 in case another attack is detected in the future. The switching operation may also be accomplished at periodic or random moments in time to either simplify operation or provide protection against an undetected attack.

It should be understood that, in the context of this disclosure, storing data and program code or other instructions and making use of such data or code according to dynamic architectures utilizing different "representations" of instructions and/or data may be implemented using various techniques and any suitable combinations thereof. Thus, in one non-limiting example, two representations of the same information (which may be program code, instructions, and/or other data) may be generated by encrypting that information using two different encryption keys and/or two different encryption schemes. In another non-limiting example, the same information may be stored in different orderings, or using different encodings. Another non-limiting example of generating different representations of instructions is generating machine code in two different instruction sets. In this example, instructions in different instruction sets may be interpreted or translated into a native instruction set of a processing unit. In some embodiments two different instruction sets may correspond to two distinct native instruction sets implemented by respective physical computing units or subunits. In some such embodiments, the different instruction sets may correspond to fundamentally different computing methods. For instance, as described further below, a computing system may have conventional binary logic circuits as well as logic circuits that implement multilevel logic operations beyond binary such as ternary logic operations, quaternary logic operations, and so on.

FIG. 1 is a block diagram illustrating an example architecture 100 having a processor 110 that may be used to enable features of embodiments disclosed herein. The architecture shown is a so-called "Harvard architecture" in which instructions and data are stored in separate memories (the data memory 142 accessed via a memory bus 141 and the instruction memory 144). Analogously to other microprocessors, the processor 110 has an arithmetic logic unit 120, registers 122, and an execution control unit (ECU 130) and a program counter 132. However, unlike a conventional microprocessor, the processor 110 is provided with configuration circuitry that allows the processor 110 to change its configuration (i.e., the effective architecture exposed to programs or other computing processes), represented in this example by a diversity control unit (DCU 150) and its interactions with the ECU 130. In some embodiments, the instruction memory 144 may be is partitioned into two buffers each containing different program code, enabling the processor 110 to execute image n while the DCU 150 generates image n+1 from image n−1 (or a copy of image n). The processor 110 has several unconventional features. One is an ability to change the encryption-based representations of the program instructions from one essentially unique choice to another. Another is the ability to store at least two instances of representation sets. Yet another is a means to detect when an instruction or set of instructions in a program is valid or invalid according to a current configuration of the processor 110. In some embodiments, the system may determine that instructions are invalid if they do not conform to an expected format associated with the current configuration. The format may specify any suitable rules including, as a non-limiting examples, that instructions are ordered according to an expected order that instructions conform to an expected encoding, or that instructions are specified according to a particular machine language instruction set.

The DCU 150 can performs several functions: it can halt processor execution to enable flushing the processor's pipeline and jumping to the address of the instruction in variant n+1 corresponding to the next instruction to be executed in variant n. The DCU 150 has read/write access to the instruction memory 144 and may have ability to change the program counter (PC 132) for changeover to a new representation, or variant. The DCU 150 may also have read/write access to the stack to modify the call/return addresses in all stack frames as needed. To provide additional security, the data in memory may be encrypted using one or more encryption and decryption modules (not shown). Encrypting the instruction memory 144 prevents an attacker from observing any cleartext addresses that would otherwise be revealed when addresses are data, as in function calls. The DCU 150 may also manage the function call stack of computer programs to ensure proper memory references. Alternatively, the DCU 150 may simply control access by the ECU 130 to instruction memory 144 via hardware circuitry so that the stack contents need not be modified. The ECU 140 may be a modified ECU that includes the ability to decrypt fetched instructions. The DCU 150 provides the ECU 140 with keys prior to execution of a variant. A direct memory access unit (DMA 143) unit enables the DCU 150 to independently access the instruction memory 144 while the processor 110 is performing register operations. In some embodiments, a DMA controller between the processor and the data bus (not shown) may enable management of other devices (e.g., peripherals for input and output) attached to the bus.

In some embodiments, the control unit of a software-programmable computer processor is provided with additional capabilities. For example, when an instruction or group of instructions is fetched, the control unit may first extract the information from the instruction; this can be implemented as a decryption operation or a translation operation into control signals that implement the instruction's purpose, i.e., to perform an operation such as an arithmetic operation, a logical operation, the input or output of data to or from memory, or a change in the order of instructions to be executed, as non-limiting examples. In this way, the decoding of instructions or opcodes that is performed by conventional processors is replaced by the more general information extraction. The control unit may also have the capability to encrypt or translate the information in an instruction or instructions using a new representation. The processor may be complemented with a program storage memory that holds the program using the representation known by the control unit. To accomplish the switching to a new representation, the memory can be subdivided into multiple memories using any number of means. The control unit also may have the capability of deciding when to switch to a new representation of the program using a number of means. This switching could be performed in response to an event, including detection of an invalid instruction or instructions. It could also be performed periodically or at random times as a way to proactively defend against attacks. Thus, as appropriate in various embodiments, the processor may: (a) interpret instructions according to any representation it can generate, (b) detect instructions that are not represented according to a currently valid representation, (c) create representations of program code and store them in memory, and (d) switch to a new representation stored in memory within one instruction cycle.

In some embodiments, the processor may be configured to securely communicate with a valid owner or a trusted proxy or agent. This complements the core ability to autonomously change its architecture or configuration. This capability can be used for the owner/proxy/agent to propose a specific representation set, or for the owner/proxy/agent to warn the processor of an impending attack, or in general, to provide external intelligence that enables the processor to change both its representation set and/or the method by which it changes its representation set.

FIG. 2 is a flowchart of an example process 200 that may be performed by a system having a reconfigurable architecture related to the example architecture 100 of FIG. 1. At step 202, the system, operating in a first configuration, receives first program code executable by processing circuitry in that configuration. At step 204, the system may transforming the first program code into an alternate representation and store it in memory coupled to the processing circuitry as second program code. The second program code is executable by the processing circuitry in a second configuration and not executable in the first configuration. At step 206, the system may receive a request to execute the first program code. At step 208, in response to that request, the system may determine that a first set of processing operations as described by the first program code differs from a second set of processing operations as described by the second program code. At step 210, in response to that determination, the system may suspend operations of the processing circuitry in response to determining that the first and second sets of processing operations are different. At step 212 the system may optionally reconfigure the processing circuitry to operate in a second configuration in which the second program code is executable and the first program code is not executable. At step 214, the system may resume operations of the processing circuitry in the second configuration. At step 216, the system may execute the second program code in place of the first program code. In some embodiments, a system performing process 200 may maintain a program counter (see FIG. 1). The system may detect unauthorized or invalid instructions while executing the first program code, record a value of the program counter, and use the recorded value to begin executing the second program code at a location corresponding to the point at which execution of the first program code was suspended, allowing the system to seamlessly continue operation in response to detecting an attack or a signal instructing the system to alter its configuration. It should be understood that, in various embodiments, some or all of these steps may be omitted while in others, any or all of the steps above may be performed in any suitable combination.

In some embodiments, transforming the first program code into the alternate representation comprises at least one of: reordering instructions of the first program in a modified order and configuring the processing circuitry to store the reordered instructions according to the modified order; altering memory location references in the first program code to refer to alternate memory locations; and encoding references to processing operations in the first program code using an alternate encoding that produces references to invalid processing operations according to the first configuration. In some embodiments, transforming the first program code into the alternate representation comprises: encrypting the first program code using an encryption key to generate encrypted program code that cannot be executed when the processing circuitry is operated in the first configuration.

In some embodiments, transforming the first program code into the alternate representation comprises: translating instructions of the first program code specified according to a first machine language instruction set into instructions specified according to a second machine language instruction set. In some such embodiments the first machine language instruction set specifies input signals and output signals having a number of possible states corresponding to a number of unique values in a first positional notation having a first radix; and the second machine language instruction set specifies input signals and output signals having a number of possible states corresponding to a number of unique values in a second positional notation having a second radix different from the first radix. In some embodiments, In some embodiments, a system may include non-binary memory and/or performing non-binary computations (e.g., ternary or quaternary computational operations) in any suitable combination. These non-binary elements may be physical; i.e., a system may include memory elements which natively store information in non-binary format and/or a system may include non-binary logic circuits. Alternatively, some or all non-binary elements may be virtual; i.e., the system may present non-binary elements through an abstraction or translation system which ultimately translates non-binary data and non-binary instructions into binary data and binary instructions.

Modern computers typically represent data as binary values. This is partly because using digital technology has certain advantages such as ease in perfectly copying data and regenerating noisy signals without degradation. Binary is the simplest form of digital computing and requires electronic components (such as diodes and transistors) whose operating states can easily represent two discrete states (e.g., 'off' and 'on' or '0' and '1'). Because the data are represented in binary when performing digital logic operations, it is common to store data as binary values and to encode operations executed by the processor(s) of a computer using binary values. However, digital data need not be stored in a binary format and digital computation need not rely solely on binary operations.

Numbers in various bases look different on the surface, but in actuality all numbering systems are mathematically equivalent. Consider the decimal notation of 19 for the following expression: $1 \times 10^1 + 9 \times 10^0$. The binary notation for 19 is 10011 which is understood to mean: $(1 \times 2^4)+(0 \times 2^3)+(0 \times 2^2)+(1 \times 2^1)+(1 \times 2^0)=19$. The trinary or ternary notation for 19 is 201 which are understood as: $(2 \times 3^2)+(0 \times 3^1)+(1 \times 3^0)=19$. The general formula to represent a base 10 numeral in any positional notation is defined as . . . $d_3 r^3 + d_2 r^2 + d_1 r^1 + d_0 r^0$ . . . wherein d is a coefficient, r is the base of the number system (e.g., r=2 for binary, r=3 for ternary), and the exponent is the position of the digit.

Computers based on binary architectures are simply a convention that is the result of general scientific inquiry and available technological breakthroughs between the 1700's and the 1930's. Known computer architectures beyond binary have been limited to ternary systems. The ternary system is one that uses positional notation with a base of three, operating with trinary digits ("trits") instead of bits. In terms of computing systems using transistors, base-3 has a genuine mathematical advantage over other numbering systems based on integers: as it is the most efficient of all integer bases and offers the most economical way of representing numbers. As an example, a single transistor can represent three or more states instead of the usual two, since a single transistor can store a three or more voltage values separated by threshold voltage values, instead of two, or conduct current in two directions when it is switched 'on'. Thus, one transistor (or similar device) can be used to represent three values (e.g., 'positive', 'zero', and 'negative', or 'greater than', 'equal, and 'less than'). In addition to conventional transistors, other devices can serve as building blocks for trinary computing devices.

As an example, existing multilevel NAND flash technologies are based on multiple threshold voltages to store ternary or quaternary bits. This technology is thereby able to store more information per chip, reducing the cost per stored gigabit. In conventional applications these chips include control circuitry that converts the ternary or quaternary information into binary information, making the flash devices appear as binary memories to the computing system. Similarly, existing dynamic random-access memories (DRAM) have a design that is also naturally capable of ternary data storage. As Q electric charges are trapped in a cell to store a "1" state, there is no charge to store a "0" state, and Q/2 charges are stored for the reference cells. As the charges of the cells within the memory array slowly leak over time, the sensing element during "read" mode compares the remaining charges to the charge left in the reference cell. The design of a ternary DRAM device is based on trapping 0, Q/2, or Q charges on the arrays as well as Q/4 and 3Q/4 on the reference cells. Such a design has lower design margins and needs to be compensated by a more accurate sensing element.

The concept of ternary memristors and resistive random-access memories (ReRAMs) may also be used to increase the bit capacity of the memory arrays. One method creates three different levels of resistivity during a programming cycle. This is done by adding more filaments between the electrodes of each cell or by enlarging the cross-section of the filaments. The three states are then defined by three resistances, typically in the 1–kΩ range for the "−1" state, 10 kΩ for the "0", and 10 MΩ for the "+1" state. In fact, a ten-state system has been demonstrated in hafnium oxide memristor devices. Native ternary memories have been suggested with magnetic random-access memories (MRAM). MRAM exploits giant magnetoresistance (GMR) in a stack of two antiferromagnetic layers with two tunnel oxides sandwiching a ferromagnetic layer and a self-reference design. The native ternary states have three different levels of resistivity. In addition, a ternary memory made from carbon nanotubes has been shown to be effective.

In binary logic, all operations can be composed of the most fundamental logic functions, which are AND, OR, and NOT. This property can be adapted to multi-valued logic (MVL) using fundamental logic functions called MIN, MAX, and NOT. The fundamental binary logic gates can only be implemented in one manner, whereas MVL is capable of describing logic operations in a plurality of ways. A MIN function gives the minimum value of the collection of input signals x, where $x \in \{0, 1, 2, \ldots, r-1\}$ and r is the radix of the signal. Similarly, a MAX function gives the maximum value of the collection of input signals. It can be proven that the binary AND function can be generalized as a MIN function, and the binary OR can be generalized as a MAX function. The NOT function corresponds to the binary inverter. MVL logic introduces a vast array of new functions, but not all will necessarily be useful.

The paradigm of computing that relies on general purpose computing architectures is being revisited due to the increase of highly specialized computing problems. For example, neural network and neuromorphic computing are considered to be superior for some classification schemes, but do not bring advantages to all general-purpose computing needs. This diversity and complexity of computing problems is driving the need for heterogeneous hardware platforms that utilize multiple, highly specialized, innovative computer architectures. In this new paradigm disclosed herein, hardware advances should no longer be evaluated on their general-purpose advantages, but rather should be evaluated on their utility for addressing specific computing problems and interoperability in a diverse computing ecosystem. This utility is multi-faceted, and is often called to include the privacy and security of the system and its computations.

It is practical to implement new highly-specialized computing architectures such as those disclosed herein while still maintaining interoperability with legacy applications and programming methods. For example, morphing operation codes have been used to modify the internal instruction set architecture (ISA) between generations while supporting the broad range of legacy x86 software available. A code-morphing manager has been described to provide a method and system for converting software from a source version to a target version. In one embodiment, a plurality of code morphers may be associated based on the input version and the output version of each code morpher. A sequence of code morphers may be determined based on the source version and the target version, and then applied to the software.

A computing system may utilize multiple digital representations of data as described above. The concept of a computing system consisting of several separate computing units, identified from 1 to N integer numbers, each computing unit capable of executing software codes written with the corresponding 1 to N positional notation instruction set, is a novel approach. Such computing systems will deliver increased information assurance from the plurality of operating configurations available. Similar to other abstracted coding languages above the machine language, high-level design of the operating system codes is accomplished at an abstract level. The developer is not required to have knowledge of the hardware requirements of each executing computing unit. A selecting scheme is used is to select the compiler (or simply the target set of instructions and or computing units) and/or operating system (OS) for code compilation. Thus, in some embodiments, a dynamic architecture computing system may manage its configuration state independently, while in some embodiments, such systems are also capable of cooperatively managing their configuration state with other devices which may provide configuration instructions and/or machine code compiled for a particular configuration of the system, as described further below. Embodiments utilizing combinations of distinct operating systems, computing units and memories, and distinct instruction sets are discussed below with reference to FIGS. 3-9, as non-limiting examples. It should be understood that nothing herein requires that a system implement the specific combination of features described below. For example, a system may utilize dynamic instruction sets without requiring a distinct operating system associated with each instruction set. Similarly, a system may utilize distinct operating systems without requiring the use of corresponding distinct instruction sets, and so on.

Figure 3:
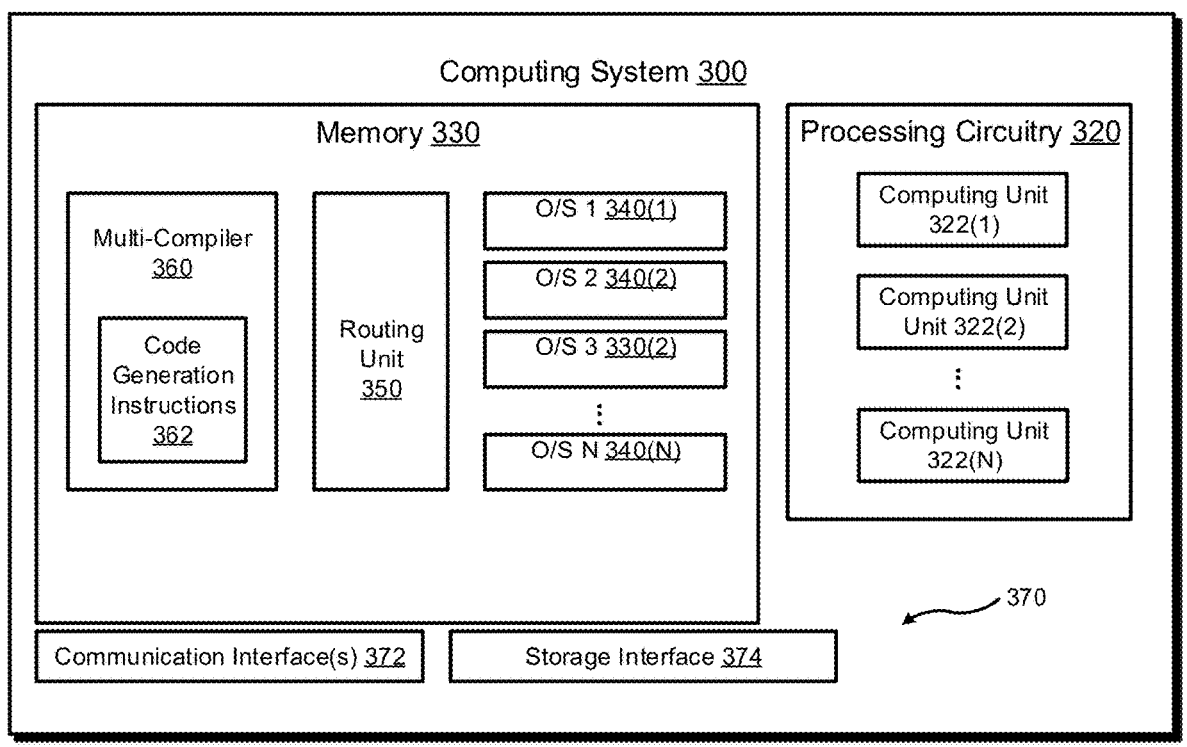
FIG. 3 is a block-level schematic of another example computing system in which embodiments of the present invention may be practiced.

FIG. 3 is a block-level schematic of a computing system 300 in which embodiments of the present invention may be practiced. The computing system 300 has processing circuitry 320, memory 330, and various interfaces 370 such as a communications interface 372, and a storage interface 374. Instantiated in the memory 330 are various processes which are executed by the processing circuitry 320. In particular, the memory 330 is shown storing and instantiating operating systems 340 (shown as operating systems 340(1) . . . 340(N)), a routing unit 350, and a multi-compiler 360. The multi-compiler 360 includes code generation instructions 362 for compiling code for the operating systems 340(1) . . . 340(N) which are executed using corresponding computing units 322(1) . . . 322(N).

It will be appreciated by one of ordinary skill in the art that while the routing unit 350 and multi-compiler 360 are depicted in FIG. 3 as software constructs instantiated in the memory 330 and executed by the processing circuitry 320, in other embodiments, the routing unit 350 and/or multi-compiler 360 may partially or completely comprise physical circuitry forming part of the processing circuitry 320. Furthermore, it should be appreciated that in some embodiments, the computing system 300 interacts with an external computing device of a user. In such embodiments, the user device is optionally supplied with a routing unit 350 and multi-compiler 360, while in other embodiments, compiling of programs occurs within the computing system 300.

Figure 4:
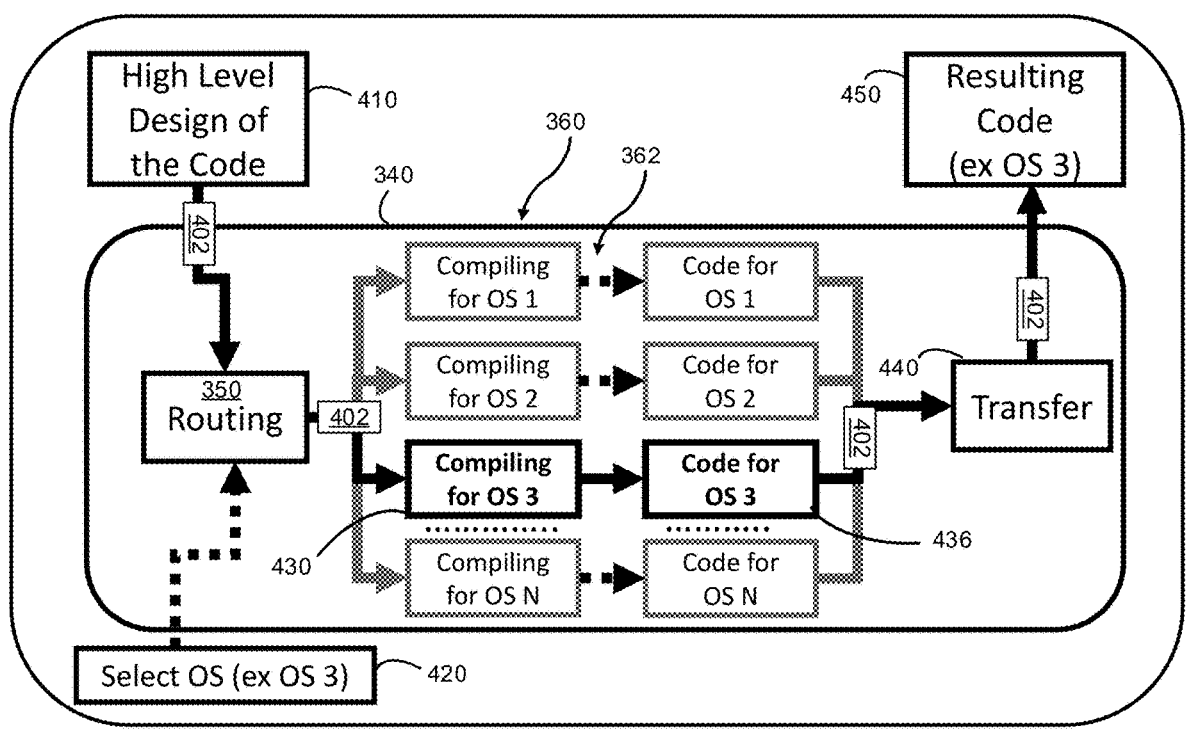
FIG. 4 is a block level schematic of a multi-compiler for a set of operating systems (OS) 1 to N, according to one embodiment.

FIG. 4 is a block-level schematic depicting the input of a high-level design code 410 into an exemplary multi-compiler, such as multi-compiler 360 of FIG. 3. The routing unit 350 receives high-level code 410, such as, for example, code written in a high-level human-readable language such as C, Python, Java, et al., and a message 420 indicating a particular target operating system, such as OS 340(3) in this example. The multi-compiler executes the appropriate compilation instructions belonging to the code-generation instructions 362, to generate the code 436 appropriate to OS 340(3). The path 402 illustrates the transition from the higher abstraction level, into the routing unit 350, to the appropriate compiling operation 362 for OS 340(3), through a transfer operation 440, producing the resulting output code 450.

Figure 5:
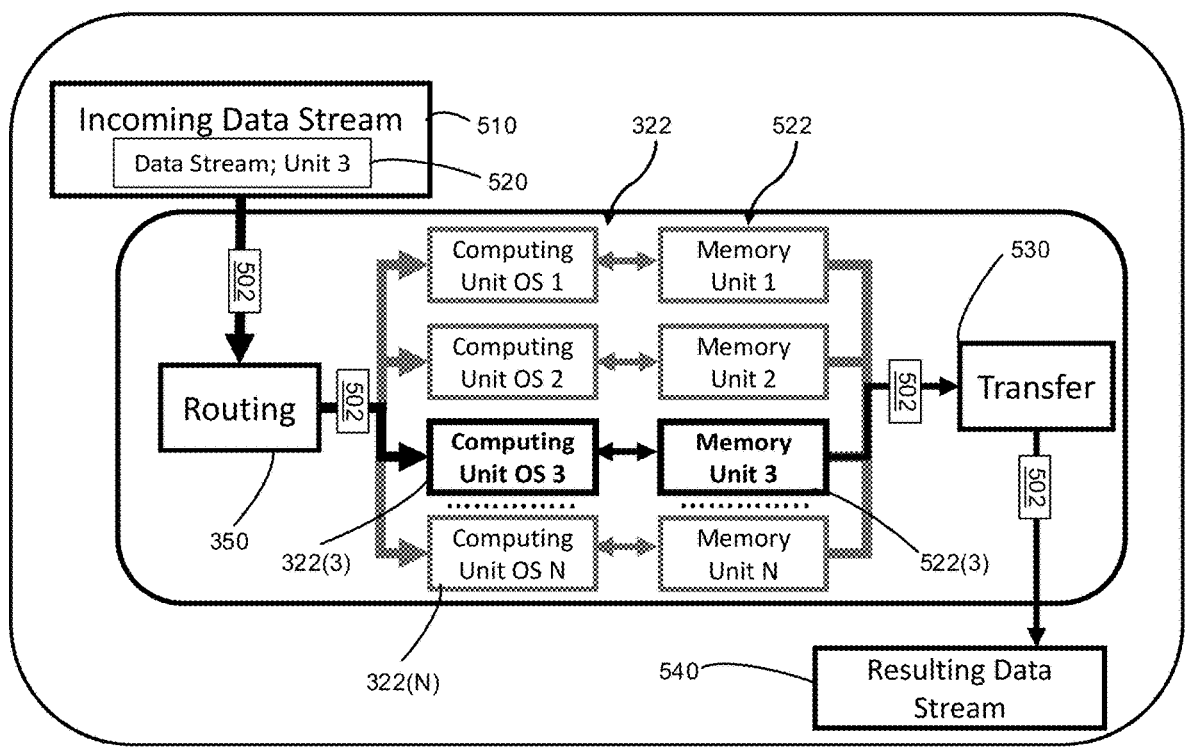
FIG. 5 shows an analysis of a data stream aimed at a particular computing unit 1 to N, according to one embodiment.

The multi-compiler architecture shown in FIG. 4 may be used in a computing system (such as computing system 300 of FIG. 3) that can select and execute operating systems and/or instruction sets 1 to N (depicted as operating systems 340(1) . . . 340(N) as depicted in FIG. 3) based on positional notation systems 1 to N. FIG. 5 shows how the routing unit 350 is used to direct an incoming data stream 510 via path 502 to the necessary computing unit 322, such as computing unit 522(3), for example; the data stream 510 will only run on computing unit 522(3) which utilizes OS 340(3) and has a bi-directional communication link with an appropriate memory unit 522, such as memory unit 522(3). In the embodiment pictured each memory unit 522 forms a portion of memory 330. Memory units 522 may be optimized for a particular OS 340 and its corresponding instruction set. For instance, OS 340(3) may use a trinary instruction set and memory 522(3) may physically comprise inherently trinary memory devices. In this manner, the corresponding computing unit 322 processes data streams with the required OS 340 and an appropriate resulting data stream 540 is generated from the input data stream 510. As shown, the incoming data stream 510 includes information 520 identifying the appropriate computing unit 322 (computing unit 322(3) as depicted by FIG. 4, for example).

The computing system 300 is capable of inputting a data streams comprised of several portions or segments or that require different computing units 322. The routing unit 350 directs each data stream to the required computing unit 322(1) . . . 322(N). Each computing unit 322 then processes the corresponding data stream for any of OS 340(1) to 340(N). The data streams generated from the multiple operating systems 340 are then combined to form a resulting final data stream.

Figure 6:
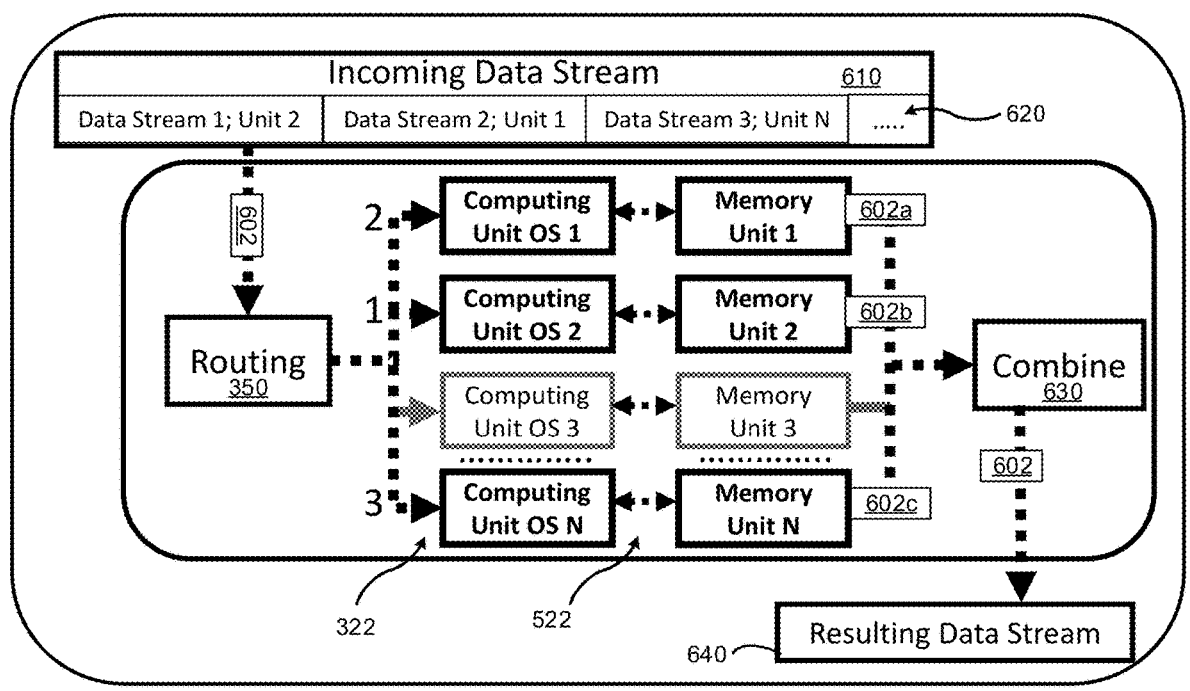
FIG. 6 depicts an analysis of a data stream comprised of several segments aimed at computing units 1 to N, according to one embodiment.

As shown in FIG. 6, the routing unit 350 directs a data stream 610 comprised of portions 620 containing code for computing units 322(1) . . . 322(N) via path 402. In this example the computing units 322(1), 322(2) and 322(N) each process one of the portions 620 of data stream 610 that are respectively associated with various operating systems 340 such as OS 340(1), OS 340(2), and OS 340(N) and their associated computing units 322 (i.e., 322(1), 322(2), and 322(N) of FIG. 3). Individual data streams generated for OS 340(1), OS 340(2), and OS 340(N) are processed (as illustrated by braches 602a, 602b, and 402c) and combined (see the 'combine' process 630) to form the resulting data stream 640. In an example embodiment, each portion 620 includes information identifying the computing unit 322 it is intended for. In other embodiments, the routing information may be included in an encrypted message from an external system, or agreed upon with an external system using methods described below.

In the embodiments described above, elements of the computing system 300 are capable of operating exclusively in any OS 340, i.e., any of OS 340(1) . . . 340(N) or analyzing data streams suitable for computing units 322(1) . . . 322(N). In addition, the computing system 300 is capable of operating in a hybridized manner, as indicated by FIG. 6, for example. The degree of hybridization can be set to variable ratios. As such, $P_n$ is defined as a variable representing either the available compiling units described in FIG. 4 or the different data streams described FIG. 6. In one embodiment, the configuration includes 20% $P_1$, 40% $P_2$ and 40% $P_n$. External systems which may transmit data streams for execution by the computing units 322 receive or are supplied with information specifying the set of allowed configurations. This configuration information may include information about the architecture of the individual computing units 322 and/or the corresponding operating systems 340. A generalized equation describing the configuration state, referred to as $C_n$, is given below as Equation 1, wherein n is constrained by the largest available positional notation for use, $P_r$ maps to a positional notation (e.g., binary, ternary, quaternary), and $\alpha_r$ is a chosen coefficient to control the distribution of hybridization across the used positional notations within the constraints of the equation.

$$C_n = \Sigma_{r=1}^n (\alpha_r P_r, 0 \le \alpha_r \le 1) \text{ and } \Sigma(\alpha_r = 1) \quad \text{(Equation 1)}$$

The system described in FIG. 6 may also be used to implement a plurality of instruction sets within a single positional notation. For example, the system can be configured to use a ternary positional notation with different computing units set to use different ternary instruction sets. As one specific example, the system could have 9 different ternary units with 9 different instruction sets.

For dynamical hybridization, the routing unit 350 can additionally be capable of temporal control of the distribution of configuration hybridization, allowing dynamic switching of the configuration hybridization. The temporal component is integrated into the configuration state model in Equation 1 through the $\alpha_r$ coefficients; Equation 1 is then modified to form Equation 2 below.

$$C(t)_n = \Sigma_{r=1}^n (\alpha(t)_r P_r, 0 \le \alpha(t)_r \le 1) \text{ and } \Sigma(\alpha(t)_r = 1) \quad \text{(Equation 2)}$$

This embodiment has an initial configuration at time $t_0$ comprising 20% $P_1$ instructions, 40% $P_2$ instructions, and 40% $P_n$ instructions. The routing unit 350 can be set for any recurrent time scale $\Delta t$ to then switch to a hybridization of 30% $P_1$ instructions, 20% $P_2$ instructions, and 50% $P_n$ instructions at a time $t = t_0 + \Delta t$. At time $t = t_0 + 2\Delta t$, the configuration can be switched to a third hybridization, and so on.

The present invention may be applied to advanced multi-state electronics including microelectronics. The different positional notations are supported by the requisite hardware that is integrated into the full computing platform. For example, in order to execute and store ternary logic, three-state electronics must be used. Dedicated custom-state microelectronics can be used for each positional notation (e.g., three-state electronics for ternary, four-state electronics for quaternary, etc.) as shown in FIGS. 4 and 5.

Figure 7A:
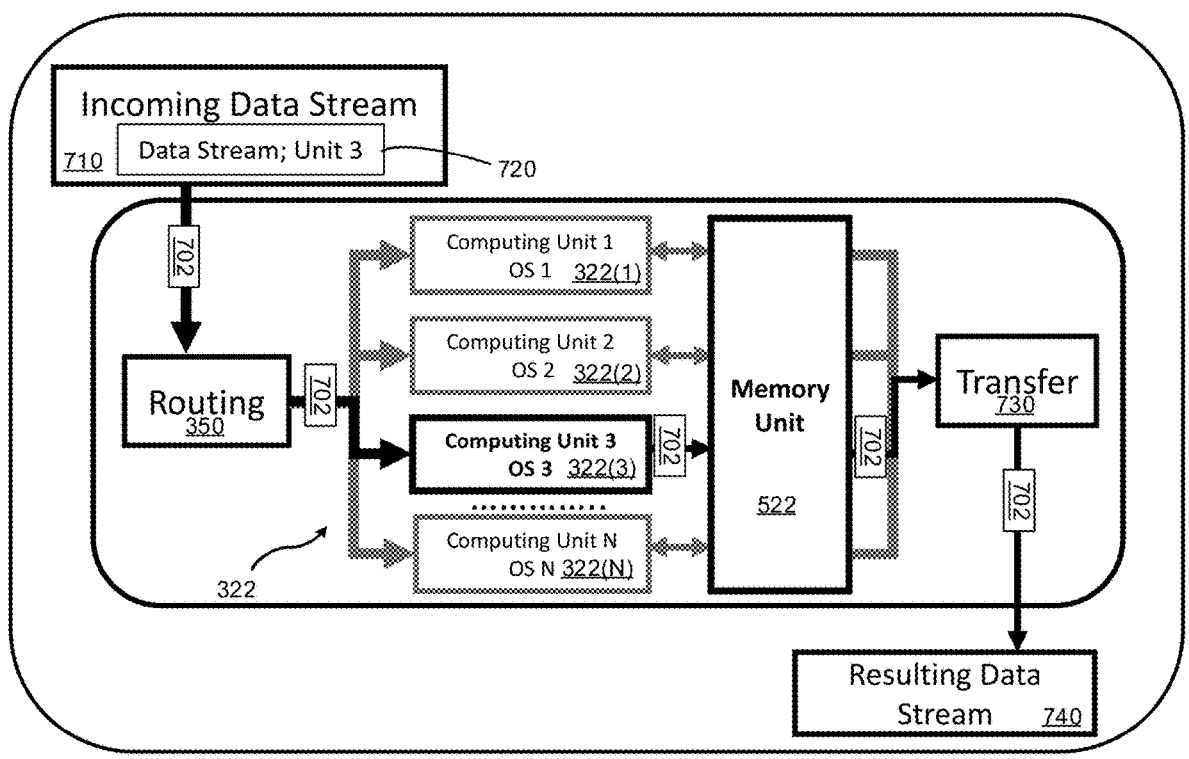
FIG. 7A depicts an analysis of a data stream aimed at a particular computing unit 1 to N with a single number system, according to one embodiment.

An additional implementation of this computing systems employs advanced multi-state microelectronics capable of supporting positional notations less than or equal to the available maximum number of states restricted by the hardware. For example, if there was a reliable ten-state memory unit, all positional notations up to ten could use the same memory unit. As illustrated in FIG. 7A, if OS 340(3) is a ternary positional notation system, then OS 340(3) only uses three of the available ten states in the shared ten-state memory unit; similarly, a quaternary system would only use four of the available ten states.

Figure 7B:
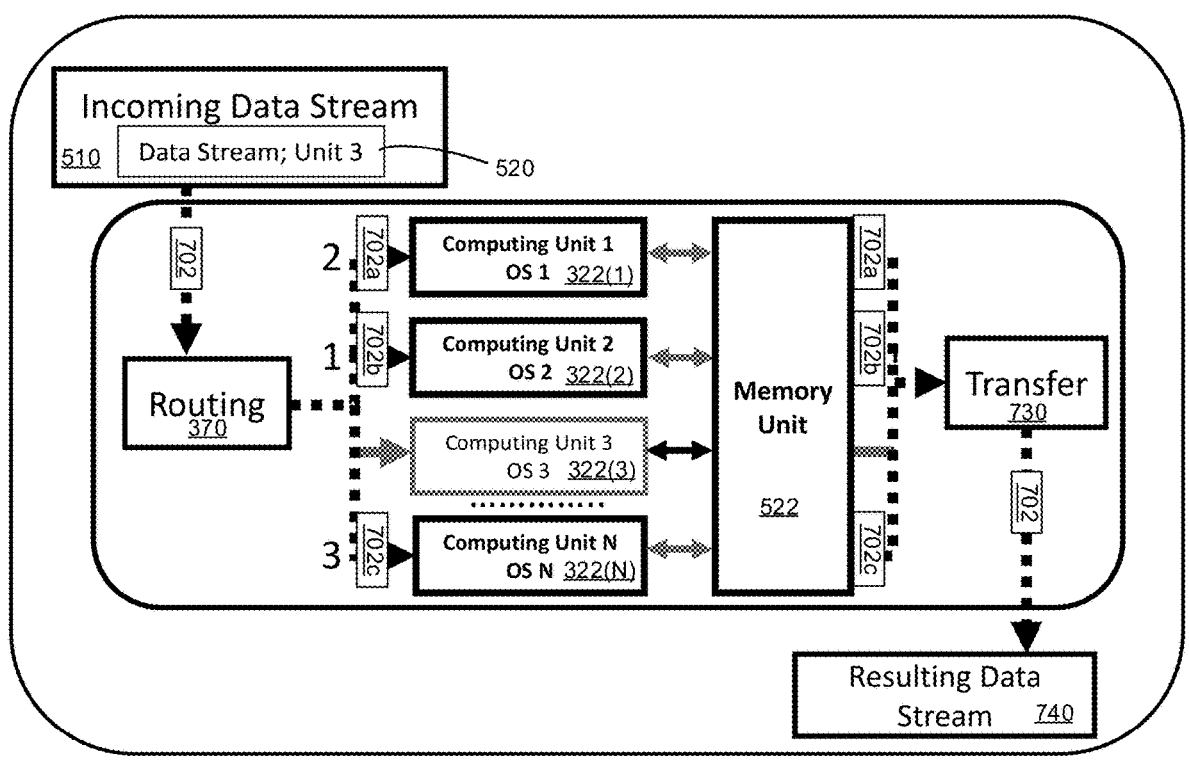
FIG. 7B depicts an analysis of a data stream comprised of several segments aimed at computing units 1 to N with a single number system, according to one embodiment.

In the embodiment shown in FIG. 7A, the routing unit directs the incoming data stream to its computing unit 322(3) via path 702. The computing unit processes the data stream 720 with OS 340(3), sharing the data stream 720 with the memory 522 (a single unit in this example) and generating the resulting data stream 740. Similarly to FIG. 5, the computing system 300 is also capable of inputting data streams comprised of several segments that require different computing units 322. The routing unit 350 directs each data stream to the required computing unit 322(1) . . . 322(N). Each computing unit 322 then processes the corresponding data stream for that OS 340(1) . . . 340(N) using the memory unit 522, shown here as a shared single-state memory. The data streams generated from the multiple operating systems 340 are then combined to form the resulting final data stream 740. One embodiment is shown in FIG. 7B, wherein the routing unit 350 directs different sections of the incoming data stream 720 to the respective computing units 322(1), 322(2), and 322(N)). FIG. 7B shows the same components as FIG. 7A. FIG. 7B adds labels 1, 2, 3 indicating routing of three segments of the incoming data stream 710 via branches 702a, 702b, and 502c. Each computing unit 322 processes the corresponding data streams with the correct OS, e.g., 340(1), 340(2), and 340(N), utilizing memory unit 522, depicted here as a shared multi-state memory resource. The individual data streams generated for OS 340(1), OS 340(2), and OS 340(N) are combined to form the resulting data stream 740.

The systems and methods described herein may be applied to security protocols. The fundamental value of this computing architecture is to enhance security between parties communicating through a non-secure channel. Assuming that a code, or portion of a code, is written with high level software tools, as described in connection with FIG. 3, it can be compiled to be executed by the computing units 322(1) . . . 322(N). Cryptography can be used to transfer the information between the communicating parties based on what particular computing unit 322(1) to 322(N) is needed to execute the transmitted code. As described in connection with FIG. 5, and FIG. 6B, several portions of the code can be written to be executed by different computing units 322. The different computing units may be specified by a specific representation of instructions used in different portions of the code. The number of possible combinations is very high. For example, with a system with ten different units, there are 10! or approximately 3.6 million, ways to process a code in ten different segments. A malicious third party will have difficulty to attack the system without knowing which computing unit 322 is needed to execute the corresponding portion of the code.

Figure 8:
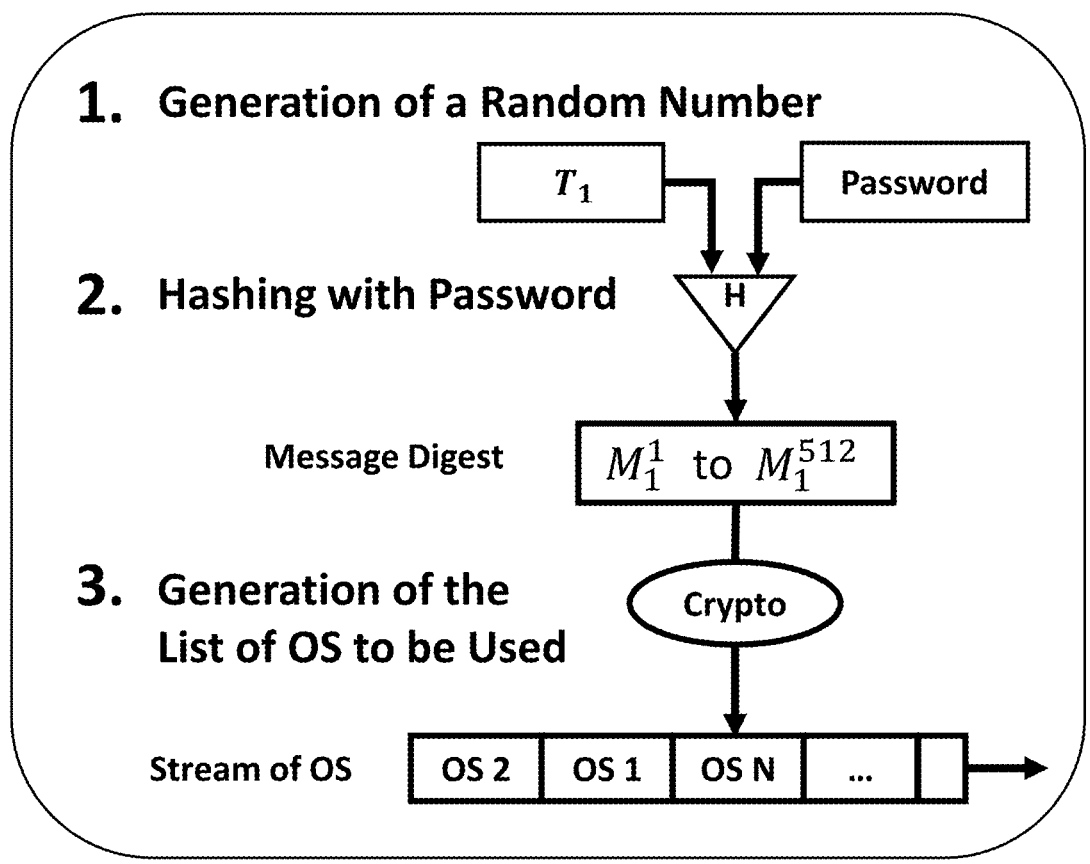
FIG. 8 is an example of a generation of a stream of Operating Systems (OS) with a Random Number and multi-factor authentication, according to one embodiment.

One embodiment of secure generation of a dynamic sequence of positions is presented in FIG. 8. A random number $T_1$ combined with a password generates a message digest through a hash function. A suitable cryptographic scheme transforms the message digest into a dynamic sequence of positions to be used to segment the code into a particular sequence (e.g., OS 340(2)/OS 340(1)/OS 340(N) as shown) in this embodiment.

Figure 9:
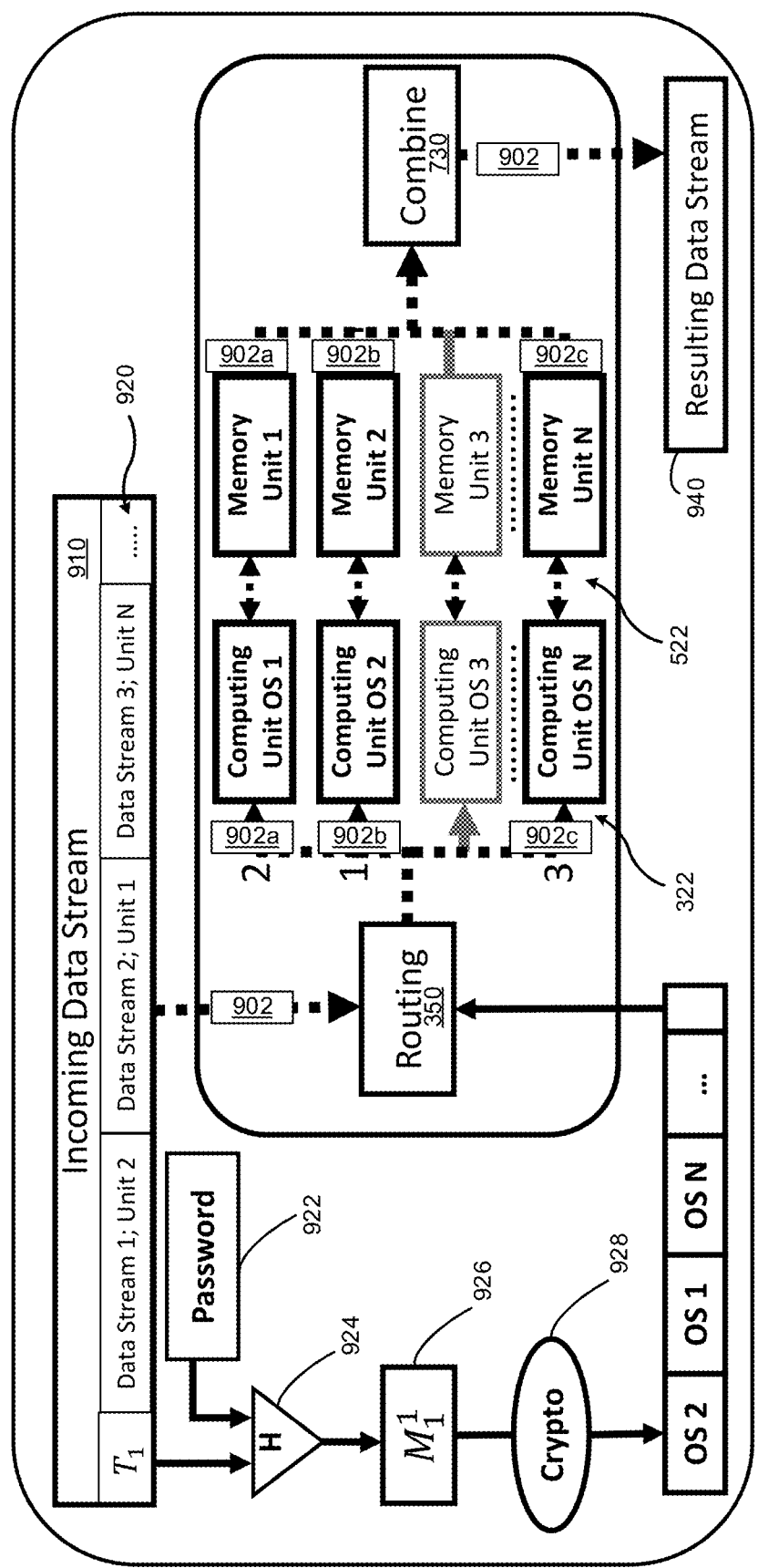
FIG. 9 shows an analysis of a data stream comprised of several segments with multi-factor authentication, according to one embodiment.

At the receiving end, as shown in FIG. 9, the same random number $T_1$ (shown as part of the incoming data stream 910), the same password (shown as 922), the same hash function (shown as 924), and message digest (shown as 926) can generate the same dynamic sequence of positions using the same cryptographic scheme (shown as 928) in order to route the incoming data stream 910 as illustrated by path 902. The originating party may transmit the random number to the receiving party as part of the data stream, as shown. Alternatively, the parties may have synchronized random number generators or otherwise share the random number between them. The portions 920 of the data stream 910 (also labeled "Data Stream 1", "Data Stream 2", and "Data Stream 3") are directed as illustrated by branches 902a, 902b, and 902c and the outputs combined (see combine operation 930) to produce the resulting data stream 940. A third party without the password 926 cannot generate the same dynamic sequence if they possess only the random number $T_1$. The list of operating systems 340 to be used during the exchange, OS 340(2)/OS 340(3)/OS 340(N), is thereby independently generated by the communicating parties. The random number can be changed as often as necessary to provide the desired level of security.

In an embodiment a computing system comprises processing circuitry and a communications interface coupled to the processing circuitry. The processing circuitry comprises a set of computing units. The set of computing units includes at least a first computing unit implementing a first machine code instruction set and a second computing unit implementing a second machine code instruction set different from the first machine code instruction set. The first computing unit is configured to receive instructions belonging to the first machine code instruction set specified in a digital encoding using a first numerical base. The second computing unit is configured to receive instructions belonging to the second machine code instruction set specified in a digital encoding using a second numerical base.

The processing circuitry is configured to execute instructions for receiving, using the communications interface, a data stream encoding a set of computer instructions and configuration information. The configuration information specifies a configuration of the set of computing units to be used to execute the computer instructions. When the configuration information specifies a first configuration, the processing circuitry is configured to execute instructions for: causing the first computing unit to execute a first subset of the computer instructions; and causing the second computing unit to execute a second subset of the computer instructions.

In an embodiment a computing system comprises processing circuitry and a communications interface coupled to the processing circuitry. The processing circuitry is configured to execute instructions for: receiving, using the communications interface, configuration information; causing a multicompiler to compile a set of computer instructions into at least two subsets based on the configuration information, each compiled subset of the computer containing machine code instructions corresponding to a respective computing unit of the external computing system; and delivering the computer instructions, as the compiled subsets, to the external computing system using the communications interface.

The configuration information specifies a current configuration of an external computing system having multiple computing units. Each computing unit implements a corresponding machine code instruction set and configured to receive instructions belonging to the corresponding machine code instruction set specified in a digital encoding using a corresponding numerical base. Each compiled subset of the computer containing machine code instructions corresponds to a respective computing unit of the external computing system.

When the configuration information specifies a first configuration, the processing circuitry is configured to execute instructions for causing the multicompiler to: compile a first subset of the computer instructions specified by the first configuration into machine code of a first computing unit of the external computing system specified by the first configuration; and compile a second subset of the computer instructions specified by the first configuration into machine code of a first computing unit of the external computing system specified by the first configuration. Each corresponding machine code instruction set is different from each other corresponding machine code instruction set.

In an embodiment a method for operating a computing system comprises providing the computing system with a first computing unit within processing circuitry of the computing system implementing a first machine code instruction set and a second computing unit within the processing circuitry implementing a second machine code instruction set different from the first machine code instruction set. The first computing unit is configured to receive instructions belonging to the first machine code instruction set specified in a digital encoding using a first numerical base. The second computing unit is configured to receive instructions belonging to the second machine code instruction set specified in a digital encoding using a second numerical base.

The method further comprises receiving a data stream encoding a set of computer instructions using a communications interface of the computing system and configuration information. The configuration information specifies a configuration of the set of computing units to be used to execute the computer instructions. The method further comprises processing the data stream by executing instructions. Executing the instructions causes the first computing unit to execute a first subset of the computer instructions according to the configuration information; and causes the second computing unit to execute a second subset of the computer instructions according to the configuration information.

Other embodiments of this aspect include corresponding computer systems, apparatus, and computer programs recorded on one or more computer storage devices, each configured to perform the actions of the methods.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A computing system, comprising:
a processor configured to execute machine code instructions specified according to at least two machine code instruction formats, the processor including configuration management circuitry configured to control a machine code configuration of the processor; and
memory coupled to the processor;

wherein the configuration management circuitry is configured to cause the processor to:
be able to execute, in a first configuration, instructions specified according to a first machine code instruction format and be unable to execute instructions specified according to a second machine code instruction format;
be able to execute, in a second configuration, instructions specified according to the second machine code instruction format and be unable to execute instructions specified according to the first machine code instruction format; and
wherein the computing system is configured to:
receive first machine code specifying first program code according to the first machine code instruction format;
generate second machine code specifying the first program code according to the second machine code instruction format and store the second machine code in the memory;
determine, in response to a first request to execute the first machine code, that the first machine code corresponds to a set of processor operations equivalent to processor operations to which the second machine code corresponds; and if so execute the first machine code
wherein the computing system is further configured to:
generate the second machine code while executing the first machine code;
determine, in response to a first request to execute the first machine code, that the first machine code specifies an identical set of processor operations as the second machine code; and if so
execute the first machine code.

2. The computing system of claim 1, wherein the computing system is further configured to:
determine, in response to a second request to execute the first machine code, that the first machine code does not correspond to a set of processor operations equivalent to processor operations to which the second machine code corresponds; and
prevent execution of the first machine code.

3. The computing system of claim 2, wherein the configuration circuitry is further configured to:
receive a signal indicating that the first machine code does not specify a set of processor operations equivalent to the second machine code; and
reconfigure the processor from the first configuration to the second configuration, in response to receiving that signal, such that instructions specified according to the first machine code instruction format cannot be executed on the processor and instructions specified according to the second machine code instruction format can be executed on the processor.

4. The computing system of claim 3, wherein the configuration circuitry is further configured to:
generate third machine code specifying first program code according to the first machine code instruction format by translating the second machine code according to the first machine code instruction format and storing the third machine code in the memory in place of the first machine code.

5. The computing system of claim 2 wherein the computing system is further configured to:
identify a foreign instruction in the first machine code having no equivalent instructions in the second machine code;
cease execution of the first machine code at a first location before execution of the foreign instruction; and
begin execution of the second machine code at a location in the second machine code equivalent to the first location.

6. The computing system of claim 1, wherein:
when the processor is configured to execute instructions specified according to the first machine code instruction format, the configuration circuitry is configured to:
reconfigure the processor, in response to receiving a security signal, such that instructions specified according to the first machine code instruction format cannot be executed on the processor and instructions specified according to the second machine code instruction format can be executed on the processor; and
when the processor is configured to execute instructions specified according to the second machine code instruction format, the configuration circuitry is configured to:
reconfigure the processor, in response to receiving the security signal, such that instructions specified according to the second machine code instruction format cannot be executed on the processor and instructions specified according to the first machine code instruction format can be executed on the processor.

7. The computing system of claim 6, wherein the security signal indicates an attempted code injection attack directed toward to the computing system.

8. The computing system of claim 6, wherein system is configured to repeatedly generate the security signal at either of a random interval and a predetermined interval.

* * * * *